United States Patent [19]

Burke, Jr. et al.

[11] 4,263,632

[45] Apr. 21, 1981

[54] VIBRATION DAMPER FOR A TRANSDUCER CARRIAGE DRIVE MECHANISM FOR USE IN A DISKETTE SYSTEM

[75] Inventors: Edward F. Burke, Jr., Reading, Mass.; David S. Dunn, Windham, N.H.

[73] Assignee: MFE Corporation, Salem, N.H.

[21] Appl. No.: 38,348

[22] Filed: May 11, 1979

[51] Int. Cl.$^3$ .............................................. G11B 21/08
[52] U.S. Cl. ...................................................... 360/106
[58] Field of Search ........................................ 360/106

[56] References Cited
U.S. PATENT DOCUMENTS 3,119,989   1/1964   Wasylenko ........................... 360/106

OTHER PUBLICATIONS

Bailey, "Drive... Attachment", IBM Tech. Disc. Bull., vol. 18, No. 7, Dec. 1975, p. 2244.
IBM Tech. Disc. Bull., Bailey, vol. 17, No. 11, p. 3426, Apr. 1975.

*Primary Examiner*—Robert S. Tupper
*Attorney, Agent, or Firm*—Cesari & McKenna

[57] ABSTRACT

A vibration damper for a transducer positioning system of a diskette system employing a stepping motor for driving a moveable transducer carriage that is coupled to the stepping motor drive means. The mass of the carriage and the coupling means form a vibratory system having a natural frequency of oscillation significantly different from the frequency of the pulses applied to the stepping motor so that while the motion of the carriage reflects the total motion of the shaft, the incremental motions of the shaft are not transmitted to the carriage thereby minimizing noise anciflary to the positioning of the carriage.

8 Claims, 10 Drawing Figures

$y = Y \sin \omega t$
$x = X \sin(\omega t + \phi)$

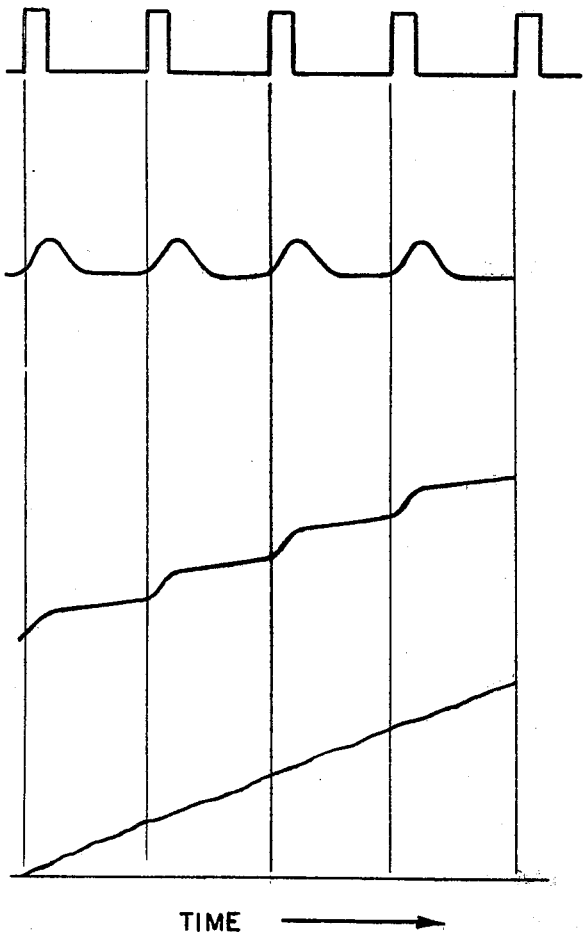

VIBRATION DAMPER FOR A TRANSDUCER CARRIAGE DRIVE MECHANISM FOR USE IN A DISKETTE SYSTEM

BACKGROUND OF THE INVENTION

The invention is related to transducer carriage drive mechanisms for magnetic diskette systems. Particularly, this invention is concerned with a means for damping the vibrations of the transducer carriage while the latter is being driven by stepping motor operating at a particular frequency during positioning of the read/write heads over the disk surface.

The particular transducer drive system to which the preferred embodiment of this invention is applied is the mechanical system disclosed in U.S. Pat. No. 4,198,871 owned by the assignee of the present application. A transducer positioning system as disclosed therein typically includes a stepping motor which rotates its shaft a predetermined angle for each electrical pulse received by the motor. The shaft of the stepping motor is mechanically linked to a movable transducer carriage through a drive band which converts rotational torque of the stepping motor to a translational force. The translational forces act upon the carriage so that the read/write heads may be positioned over selected tracks on a rotating data storage disk.

A typical positioning controller for a stepping motor will transmit a number of pulses to the stepping motor according to the number of tracks across which the transducer is to be moved. For example, with a one-to-one correspondence between the number of steps and the number of tracks traveled, 50 pulses, or a multiple thereof, will be transmitted by the controller to make the stepping motor advance that carriage, intermittently, 50 tracks across the disk surface. Thus, if each rotational step of the motor shaft is, say 1.8 degrees, rotation of the stepping motor shaft through a total angle of 90 degrees is mechanically translated to the 50-track move, or one inch with a typical track pitch of 0.020 inch. In the motor and mechanical structure employed in the aforementioned patent application, two 1.8 degree rotational steps translate into a one track move. A flexible metal drive band couples the motor shaft to the movable carriage. This link, though flexible, is rigid in the direction of the carriage movement and is generally coupled directly to the carriage.

Undesirable consequences result, however, from the rapid acceleration and deceleration of the carriage mass during pulsing of the stepping motor. Specifically, the rapid start-stop motion of the carriage mass, in reaction with its mechanical environment, generates a substantial amount of audible noise and causes other deleterious inertial effects on the diskette system.

Accordingly, an objective here is to eliminate or substantially reduce the noise so generated, and to reduce harmful effects on the diskette system caused by the associated intermittent force impulses.

It is another object of this invention to dampen the mechanical forces acting upon a movable transducer carriage in a magnetic diskette system.

It is a further object of the invention to reduce the level of noise generally associated with the movement of a transducer carriage by a stepping motor.

It is yet another object of the invention to reduce or eliminate harmful or deleterious effects on a magnetic recording diskette system caused by intermittent acceleration and deceleration forces acting upon the rigid mechanical linkages of the transducer positioning mechanism.

Other objects of the invention will become more readily apparent upon review of the succeeding disclosure taken in connection with the appended drawings.

SUMMARY

In view of the foregoing, the objects of this invention are accomplished by the interposition of a coupling spring between the movable carriage and the carriage drive means, specifically, in the preferred embodiment, between the carriage and the flexible drive band. The mechanical system comprising the spring constant of the spring, in cooperation with the mass of the carriage, is designed to possess an inherent natural frequency of oscillation much lower than the frequency of the stepping motor movements, thereby filtering out the high frequency torque impulses of the stepping motor. As a result, only the low frequency components of the drive band movements are transmitted to the carriage for positioning of the read/write heads. Specifically, when the carriage undergoes multiple-step displacement, the total displacement is transmitted to the carriage by the coupling spring, but the individual steps are not. This materially reduces the noise and vibration previously associated with stepwise movement.

Additionally, the coupling spring is at least sufficiently stiff so that the friction between the carriage and its support members does not introduce unacceptable hysteresis causing misalignment between the heads and the desired data track upon settling of the carriage after termination of the stepping motor impulses.

BRIEF DESCRIPTION OF THE DRAWINGS

FIG. 4(a) depicts electrical pulses transmitted to, and also approximates the torque impulses produced by, the stepping motor shown in FIGS. 1(a) and 1(b).

FIG. 4(b) approximates a response curve representing the velocity of the drive band, and in prior art positioning mechanisms, the velocity of the movable transducer carriage.

FIG. 4(c) approximates the displacement versus time response of the movable transducer carriage in the absence of the improvement of this invention.

FIG. 4(d) approximates the displacement versus time response of the movable transducer carriage which incorporates the improvement of this invention.

DESCRIPTION OF AN ILLUSTRATIVE EMBODIMENT

Figure 1A:
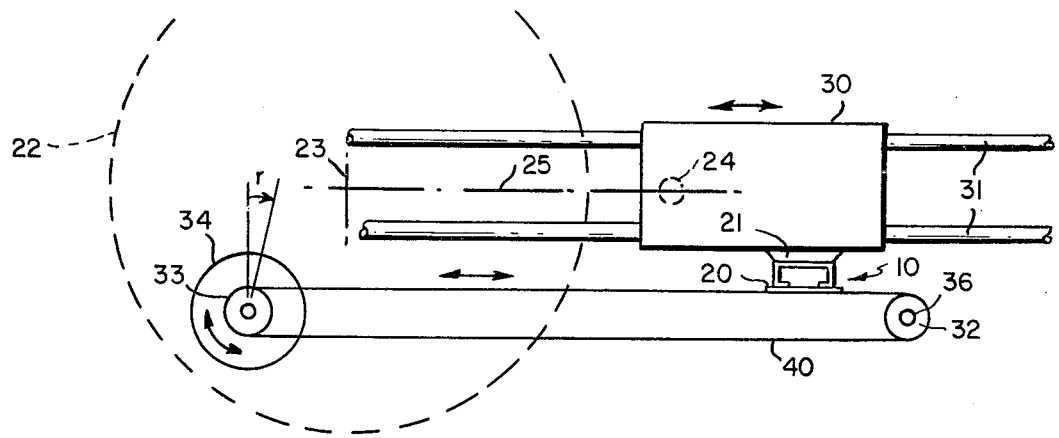
FIG. 1(a) is a top view of the transducer positioning and drive mechanism.
Figure 1B:
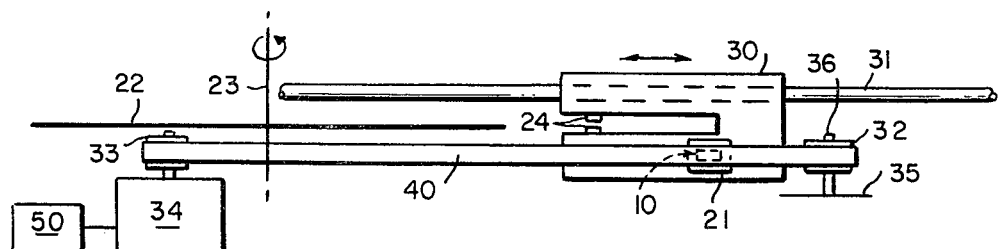
FIG. 1 (b) is a side view of the apparatus shown in FIG. 1(a).

Referring to FIGS. 1(a) and 1(b), magnetic disk 22 rotates around an axis 23 at a predetermined speed, say 300 revolutions per minute. A pair of transducers 24 are mounted on a carriage 30 which is slideably supported by support rods 31. Torsional impulse forces produced by the stepping motor 34 are imparted to a flexible metal drive band 40, which in turn, imparts translational forces to the carriage 30 to which, it is connected. These translational forces cause the carriage 30 and the transducers 24 to move along radius 25 of the disk 22.

The flexible drive band 40, shown to be an endless belt, is preferably composed of a flexible metal material. The drive band is engaged around spindle 33 which is connected to the shaft of stepping motor 34 and also about and idler wheel 32 which also provides tension for the drive band.

In prior art devices of this general type, the carriage 30 is generally coupled directly to the drive band 40. Thus, the intermittent torque impulses produced by the stepping motor are directly imparted to the carriage. During multiple track moves, then, a series of force pulses sequentially act upon the carriage. The intermittent forces produced by the stepping motor appear at the carriage at the same frequency as the pulses which energize the stepping motor.

In operation, the stepping motor 34 is energized by a pulse generator 50. A typical waveform produced by the generator 50 for energizing the stepping motor is shown in FIG. 4(a) which depicts a series of pulses transmitted at a frequency "f". Assuming a substantially instantaneous electrical response time of the stepping motor to the energization pulses, the intermittent forces produced by the stepping motor also resemble the waveform of FIG. 4(a).

The mechanical response of the system, however, is somewhat slower than its electrical response. Its response characteristics may be mathematically derived by taking into account the combined mass of all interconnected moving parts in the transducer positioning system, the frictional forces acting on each component, and the net spring constant derived from the tensile and compressive characteristics of the respective interconnected elements. Specifically included in such calculations are the masses of the stepping motor armature and shaft, spindle 33, idler 32, drive band 40, carriage 30, and any connection means therebetween.

The actual velocity versus time behavior of each point in the moving system, in response to the intermittent forces, is more closely approximated in FIG. 4(b). As seen from that figure, the components of the moving system including the drive band are accelerated and decelerated in synchronism with the torque impulses from the stepping motor so that the velocity of the components varies in a periodically pulsating fashion. The exact movement of each individual component in the entire mechanical system will vary according to, among other things, its mass and relative position in the system. Because the velocity pulses are transmitted directly through the drive band to the carriage, the carriage moves incrementally along rods 31 in a stepwise manner as shown by the waveform in FIG. 4(c).

We have found that this intermittent movement of the carriage 30 along the support rods 31 generates most of the noise in a transducer positioning system of this type. In our efforts to reduce this noise, it occurred to us that some form of mechanical filter could be introduced between the carriage and the stepping motor to isolate the forces from the motor torque impulses. In that regard, we envisioned a model of the carriage drive spring-mass system shown in FIG. 3(a). To implement that model, we interposed a coupling spring 10 between the drive band 40 and the carriage 30 as shown in FIGS. 1(a) and 1(b). Such a spring can be placed at any one or more of several points in the mechanical system, such as, for example, between the stepping motor shaft and spindle 33; for perhaps directly in the drive band 40. We also chose the spring constant K of the coupling spring 10 such that the natural resonant frequency "f(n)" of oscillation of the spring-mounted carriage is substantially different from the frequency "f" of the stepping motor impulses. When "f(n)" equals "f", /maximum vibration occurs. When "f(n)" is less than or greater than "f", vibration is attenuated. A greater attenuation can be obtained by choosing a spring 10 that has a spring constant which establishes an "f(n)" much lower, rather than higher, than "f". The preferred embodiment of this invention will incorporate such a spring.

Figure 3A:
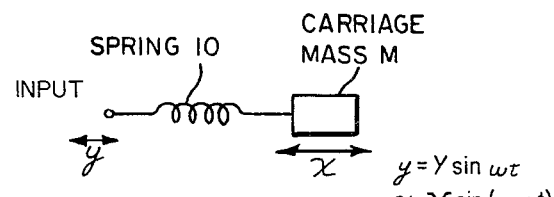
FIG. 3(a) shows a model of the mass and spring system which characterizes the carriage mass and shear spring system of this invention.
Figure 3B:
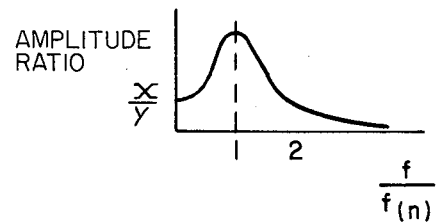
FIG. 3(b) shows an approximation of the relationship between the magnitude of vibration and the ration "f/f(n)", where "f" is the frequency of torque impulses produced by the stepping motor and "f(n)" is the resonant frequency of a vibratory system incorporating the improvement of the subject invention.

The mechanical response characteristics of the positioning system with the interposition of the coupling spring, as indicated, are shown in FIG. 3(b), the ordinate being representative of the magnitude of vibration of the carriage, and the abscissa being the ratio "f/f(n)" where "f" is the frequency of the stepping motor impulses and "f(n)" is the resonant frequency of the spring-mass system shown in FIG. 3(a). A minimum vibration amplitude occurs when the resonant frequency "f(n)" is low compared with the pulse frequency "f", i.e. with a relatively high ratio "f/f(n)". A ratio of at least 2:1 is generally preferred.

In other words, the improvement of this invention filters the intermittent forces produced by the stepping motor. As will be subsequently more fully explained, the coupling spring 10 possesses a spring constant K, which, when reacting with mass M of carriage 30, filters the high frequency components and passes the low frequency components of the translational forces.

With the incorporation of a coupling spring between the carriage and the drive band, and with a properly chosen spring constant K, an improved displacement versus time response of the carriage now results as depicted in FIG. 4(d). As seen from that waveform, the displacement is quite linear in comparison with the displacement response of the usual positioning system as depicted in FIG. 4(c). This reduction of stepwise motion provides the noise abatement characteristics of the present system.

With an understanding of the foregoing theory of interaction between the several mechanical elements of the system, we will describe the details of one preferred spring 10 embodiment.

Figure 2A:
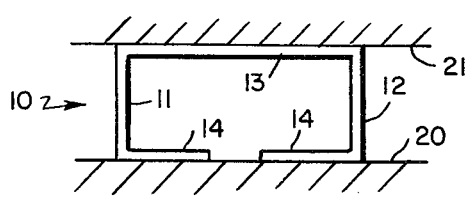
FIGS. 2(a) and 2(b) are enlargements showing the details of the coupling spring in FIGS. 1(a ) and 1(b).
Figure 2B:
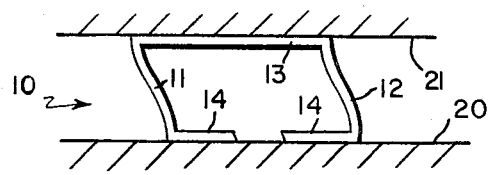

Refer now to the FIGS. 2(a) and 2(b) which show a coupling spring 10 having the shape of a parallelopiped. It includes a pair of spaced parallel end walls 11 and 12, and complementary spaced parallel side walls 13 and 14. The spring 10 is then, in essence, a shear spring composed, in the preferred embodiment, of stainless steel. Its side wall 13 is secured by way of a rigid connection brace 21 to carriage 30, its opposite wall 14 being secured by a plate 20 to belt 40.

The shear spring is interposed between the drive band and the carriage as shown in FIGS. 1(a) and 1(b) so that the shear stresses produced therebetween by the start-stop motion of the carriage in the direction shown are absorbed by the spring. The shear spring 10 may take on a variety of different forms, but the structure illustrated herein is preferred.

When shear stresses are intermittently induced in the system due to torque impulses from the motor 34, spring 10 will undergo bi-directional deformation as shown in FIG. 2(b). When the spring is arranged to provide the desired ratio of "f" to "f(n)", much of the step-like motion generally associated with carriage positioners of this type is absorbed by the spring. A nearly constant force, opposite in direction to the frictional forces between the support rods 31 and the carriage 30, then acts upon the carriage. The net result is that the carriage 30 travels at a substantially uniform rate as it is displaced relative to disk 22.

Since the noise attenuation provided by the invention is enhanced by a large value of the ratio "f/f(n)", it is desirable to provide a low natural resonant frequency "f(n)". This, in turn, leads to as low a spring constant K as practicable. However, there is a lower limitation of the stiffness of the spring, this limit depending on the magnitude of the frictional force acting on the carriage. As the carriage approaches its rest position upon termination of the stepping motor impulses, the action of the spring should apply a force to the carriage mass that is sufficient to overcome the opposed frictional force on the carriage mass produced by the carriage support rods. Thus, the transducers, which are mounted on the carriage, will stop sufficiently close to the desired track location so as to be within the track alignment tolerance.

The drawing figures provided herein are only for illustrative purposes, it being noted that several modifications, changes, or adaptations in arrangement may be made to accomplish low-pass mechanical filtering as herein described. For example, a coupling spring 10 in the form of a coil spring may be more suitable in some mechanical positioning arrangements.

Accordingly, it is not the intent of the inventors to limit the scope of their invention to exactly what is shown or described, but to include all such modifications, changes, or arrangements which may be made by a person skilled in the art and which fall within the spirit of this disclosure. The scope of the invention is more appropriately defined by the appended claims.

Now that a description of the invention has been made, we claim:

1. An improvement in the transducer positioning system of a magnetic diskette system, said positioning system including a movable transducer carriage for positioning a transducer over a selected data track of the magnetic recording disk, a stepping motor that produces incremental changes in position of said carriage upon pulsing, and coupling means that couples said carriage and said stepping motor, which improvement comprises:
   a mechanical filter including spring means for isolating stepwise movement of said stepping motor from said carriage, said spring means and carriage mass establishing a vibratory system which has a natural frequency of oscillation different from the frequency of the pulses of said stepping motor so that while the motion of the carriage reflects the total motion of the stepping motor shaft, the incremental motions of the shaft are not transmitted to the carriage thereby minimizing the noise ancillary to the positioning of the carriage.

2. A transducer positioning system for use in a magnetic diskette system, said system including a rotating magnetic record medium having plural data tracks thereon for storing magnetic data, which system comprises:
   a movable carriage for supporting at least one transducer and for positioning said transducer over a preselected data track on said recording medium,
   guide means for guiding said movable carriage relative to said recording medium,
   a stepping motor that produces incremental changes in position of said carriage upon pulsing with electrical energy,
   drive means interconnecting said stepping motor and said movable carriage for transmitting movements of said stepping motor to said movable carriage for positioning said transducer over said preselected data track in accordance with said incremental position changes of said stepping motor, and
   coupling means interposed between said stepping motor and said movable carriage for filtering said stepping motor impulses from said carriage, said coupling means including spring means that isolates stepwise movements of the stepping motor from said carriage, said spring means and the mass of said carriage establishing a vibratory system which has a natural frequency of oscillation different from the frequency of the pulses applied to said stepping motor.

3. The invention as recited in claim 1 or 2 wherein the natural frequency of oscillation of said vibratory system is substantially less than the frequency of the pulses applied to said stepping motor.

4. The invention as recited in claim 1 or 2 wherein the natural frequency of oscillation of said vibratory system is less than one half of the frequency of the pulses applied to said stepping motor.

5. The invention as recited in claim 1 or 2 wherein said vibratory system includes a drive band for converting tortional forces of said stepping motor to translational forces for positioning said movable carriage.

6. The invention as recited in claim 5 wherein the spring means comprises a shear spring interposed between said movable carriage and said drive band.

7. The invention as recited in claim 5 wherein the spring means comprises a torsional spring interposed between said stepping motor shaft and said drive band.

8. The invention as recited in claim 5 wherein said spring means comprises a shear spring consisting of an integral flexible metallic structure having an upper portion, lower portion, and two side portions therebetween that connect to said upper and lower portions, said upper portion being connected to said movable carriage and said lower portion being connected to said drive means, ssaid structure being positioned to absorb shear stresses in the direction of movement of said carriage means and said drive means.

* * * * *